United States Patent [19]

Maeda et al.

[11] Patent Number: 4,870,432

[45] Date of Patent: Sep. 26, 1989

[54] INK-JET PRINTING APPARATUS AND FILM NOZZLE MEMBER USED IN THE SAME

[75] Inventors: Michio Maeda, Kanagawa; Kiyoshi Hashimoto, Ichikawa, both of Japan

[73] Assignee: Kabushiki Kaisha Toshiba, Kawasaki, Japan

[21] Appl. No.: 180,886

[22] Filed: Apr. 13, 1988

[30] Foreign Application Priority Data

Apr. 17, 1987 [JP] Japan .................................. 62-94477

[51] Int. Cl.[4] ......................... G01D 15/16; B41J 32/00

[52] U.S. Cl. .................................. 346/140 R; 400/196

[58] Field of Search ..................... 346/140 R, 140 PD; 400/126, 196, 197, 202, 202.1, 202.2

[56] References Cited

U.S. PATENT DOCUMENTS

| | | | |
|---|---|---|---|
| 4,282,533 | 8/1981 | Brooks | 346/75 |
| 4,514,741 | 4/1985 | Meyer | 346/140 PD |
| 4,608,577 | 8/1986 | Hori | 346/140 R |
| 4,751,527 | 6/1988 | Oda | 346/140 PD |

FOREIGN PATENT DOCUMENTS 60-71260 4/1985 Japan .

*Primary Examiner*—E. A. Goldberg
*Assistant Examiner*—Mark Reinhart
*Attorney, Agent, or Firm*—Foley & Lardner, Schwartz, Jeffery, Schwaab, Mack, Blumenthal & Evans

[57] ABSTRACT

An ink-jet printing apparatus comprises a thermal printing head having heating elements, and a film nozzle member having a plurality of holes for holding an ink and a plurality of connecting grooves for connecting same of the plurality of holes, said plurality of connecting grooves being formed in a surface thereof opposing the heating elements of the thermal printing head. While the heating elements are selectively heated, bubbles are formed in the heated ink filled in the plurality of holes in the film nozzle member as it passes over the heating elements, said bubbles being formed adjacently to the heating elements, and the ink ejected from the plurality of holes by the pressure created by the bubbles is attached to a printing member conveyed near the film nozzle member in the vicinity of the thermal printing head, thereby performing printing.

15 Claims, 5 Drawing Sheets

INK-JET PRINTING APPARATUS AND FILM NOZZLE MEMBER USED IN THE SAME

BACKGROUND OF THE INVENTION

1. Field of the Invention

The present invention relates to an ink-jet printing apparatus and a nozzle member used in the same and, more particularly, to a film nozzle member having a plurality of holes for holding ink and an ink-jet printing apparatus wherein the ink in the holes is selectively heated by heating elements formed on an upper end portion of a thermal printing head while the nozzle member is moved on the thermal head, the ink is ejected from the holes by the pressure of bubbles formed adjacently to the heating elements in the heated ink, and the ejected ink is attached to a recording medium which is being conveyed in the vicinity of the thermal head and close to the nozzle member, thereby performing printing.

2. Description of the Related Art

Conventionally, non-impact printing methods including an electrostatic printing method, a thermal printing method, a thermal transfer printing method, an ink-jet printing method, etc. and the like have been proposed.

Among them, the ink-jet printing method is advantageous in that it generates low noise, requires low power, can be made compact, is easily applicable to color printing, and can perform relatively high-speed printing.

The ink-jet printing method is roughly classified into a continuous jet-type, intermittent jet-type, on-demand type, and ink mist type ink-jet by the differences in the arrangements of the ink droplet generating means. The on-demand type ink-jet printing method is the main trend in these days due to a simple arrangement. As the on-demand type ink-jet printing method, a Gould method and a bubble jet method are used in practice. In the Gould method, ink droplets are ejected from a tubular nozzle member by radial contraction of a cylindrical piezoelectric transducer arranged to surround the nozzle member. In the bubble jet method, ink droplets are ejected from a tubular nozzle member by the pressure of bubbles that are formed adjacently to the heating elements in the ink in the nozzle number by instantaneously heating elements in the nozzle member.

However, in either the Gould or bubble jet method, a single tubular nozzle member having a very small diameter corresponds to a single piezoelectric transducer or a heating element. Therefore, ink tends to clog in the nozzle member if the ink-jet apparatus is not used for a long period of time, or bubble retention in the nozzle member tends to occur immediately after ink ejection. In the Gould method, the integration density of tubular nozzle members is comparatively lower than the integration density of printing dot forming means of various other non-impact printing apparatuses. Therefore, the resolution of a printed character, figure, and other symbols is not higher than that of the various other non-impact printing apparatuses. Although the printing speed of a Gould or bubble jet-method non-impact serial printing apparatus is higher than that of various other non-impact serial printing apparatuses, it is lower than that of a non-impact line printing apparatus of another method. This is because it is difficult to increase the integration density of nozzle members.

A non-impact ink-jet printing apparatus disclosed in Japanese Pat. Disclosure (Kokai) No. 60-71260 which is a base application for U.S. Pat. No. 4,608,577 is developed to eliminate the drawbacks of the conventional non-impact ink-jet printing apparatuses.

The novel ink-jet printing apparatus uses as a nozzle member a film which is made of a metal, a heat-resistant synthetic resin, or a multilayer member of the metal and resin, and has a plurality of holes with a diameter of 10 to 200 μm. The film nozzle member is slid on the heating elements of the thermal printing head while ink is filled in the holes. Bubbles are generated adjacently to the heating elements in the ink rapidly heated by the heating elements, and the pressure of the bubbles ejects ink droplets from the holes. The ejected ink droplets are attached to the recording medium (normally a recording paper), which is being conveyed close to the film nozzle member in the vicinity of the thermal printing head, and form ink dots. A character, figure, or other symbols is printed by a group of ink dots.

In the novel ink-jet printing apparatus described above, since long and narrow tubular nozzle members are not used, ink clogging or bubble retention in the nozzle members does not occur in principle. The integration density of the holes can be increased to be considerably higher than that of small-diameter tubular nozzle members described above, and these holes can be formed in a relatively large area at a high density. Therefore, when such a film nozzle member haviing a plurality of holes formed in a relatively large area at a high density is combined with a thermal printing head having a plurality of heating elements, high-resolution, high-speed printing is enabled.

However, in order to obtain a sufficient printing density with the novel ink-jet printing apparatus, the film nozzle member filled with ink in its holes must be conveyed at least the same speed as the conveying speed of the recording medium. During printing, nonused holes (i.e., a hole sufficiently filled with the ink) must constantly be supplied to heating elements of the thermal printing head. Accordingly, the film nozzle member must have a length larger than that of the recording medium. When a film nozzle member having such a length and a thermal printing head are combined as a detachable cartridge, the cartridge becomes comparatively large and the entire printing apparatus cannot be made compact. Also, the film nozzle member and the thermal printing head wear within a short period of time, resulting in a short service life.

When the conveying speed of the film nozzle member is decreased to be lower than that of the recording medium, the length of the film nozzle member can be decreased. As a result, the cartridge and then the entire printing apparatus can be made compact, and progress of wear of the film nozzle member and the thermal printing head can be considerably delayed, resulting in a considerably long service life. In this case, however, if the same heating element is consecutively heated, a hole which contains no ink or only a small amount of ink upon the former ink ejection is heated again before it is refilled with ink. When such a hole is heated, it ejects substantially no ink, and the printing density is decreased.

In the novel ink-jet printing apparatus described above, when the urging force of the film nozzle member against the thermal printing head is excessively large, an ink for refilling that must be retained between the thermal printing head and the film nozzle member is squeezed out from the gap between them. Therefore, even when the same heating element is not consecutively heated, the holes which contains no ink or only a small amount of ink upon the former ink ejection cannot be sufficiently refilled with ink, resulting in a decrease in printing density.

SUMMARY OF THE INVENTION

The present invention has been made based on the above situation and has as its object to provide an ink-jet printing apparatus wherein ink in a plurality of holes formed in a film nozzle member is heated by heating elements of a thermal printing head, the ink is ejected from the holes by the pressure of the bubbles generated adjacently to the heating elements in the heated ink, and the ejected ink is attached to a recording medium which is being conveyed close to the film nozzle member in the vicinity of the thermal printing head, thereby performing printing, while at the same time a cartridge as a combination of the film nozzle member and the thermal printing head and the entire printing apparatus can be made compact, the service life of the film nozzle member and the thermal printing head can be prolonged, and even when the same heating element is consecutively heated or when the urging force of the film nozzle member against the thermal printing head is excessively large, a sufficient printing density can be maintained; and to provide the film nozzle member used in such a printing apparatus.

The above-described objects of the present invention can be achieved when the film nozzle member used in the ink-jet printing apparatus of the type described above has, in its surface opposing the heating elements of the thermal printing head, a plurality of grooves each connecting some of the plurality of holes, so that the some holes are connected to each other through the corresponding connection groove.

More specifically, in the ink-jet printing apparatus of the present invention having the arrangement described above, when the film nozzle member is conveyed at a speed considerably lower than that of the recording medium or when the urging force of the film nozzle member against the thermal printing head becomes excessively large due to some reasons, once a hole contains no ink or only a small amount of ink upon printing, it is immediately refilled with ink from other nonused holes through a grovoe connecting the holes. Therefore, even when a heating element corresponding to a single hole is repeatedly and consecutively heated for performing printing, a sufficient printing density is maintained, and satisfactory printing can be performed. By conveying the film nozzle member at a speed considerably lower than that of the recording medium, its size along the convey direction can be reduced, and the cartridge as the combination of the film nozzle member and the thermal printing head and accordingly the entire printing apparatus can be made compact. Furthermore, wear between the film nozzle member and the thermal printing head is decreased, thereby prolonging their service life.

DESCRIPTION OF THE PREFERRED EMBODIMENT

The preferred embodiment of the present invention will be described with reference to the accompanying drawings.

The principle method for printing with an ink-jet printing apparatus using a film nozzle member is disclosed in FIG. 17 of U.S. Ser. No. 868,112 now U.S. Pat. No. 4,751,527.

The film nozzle member used in this apparatus is made of a metal, a heat-resistant synthetic resin, or a multilayer member of the metal and resin, and has a plurality of holes with a diameter of 20 to 100 μm. The film nozzle member having ink filled in its plurality of holes is slid above the heating elements of the thermal printing head. During sliding, the heating elements are selectively heated. The ink filled in holes located on each heated heating element is rapidly heated, and within the heated ink bubbles are formed which are adjacent to the heating element. The pressure created by the bubbles ejects the ink from the hole. The ejected ink droplets are attached to a recording medium (normally a recording paper) conveyed near the film nozzle member in the vicinity of the heating element of the thermal head, thereby forming an ink dot. Characters, figures, and other symbols can be printed by a group of the ink dots.

Figure 1:
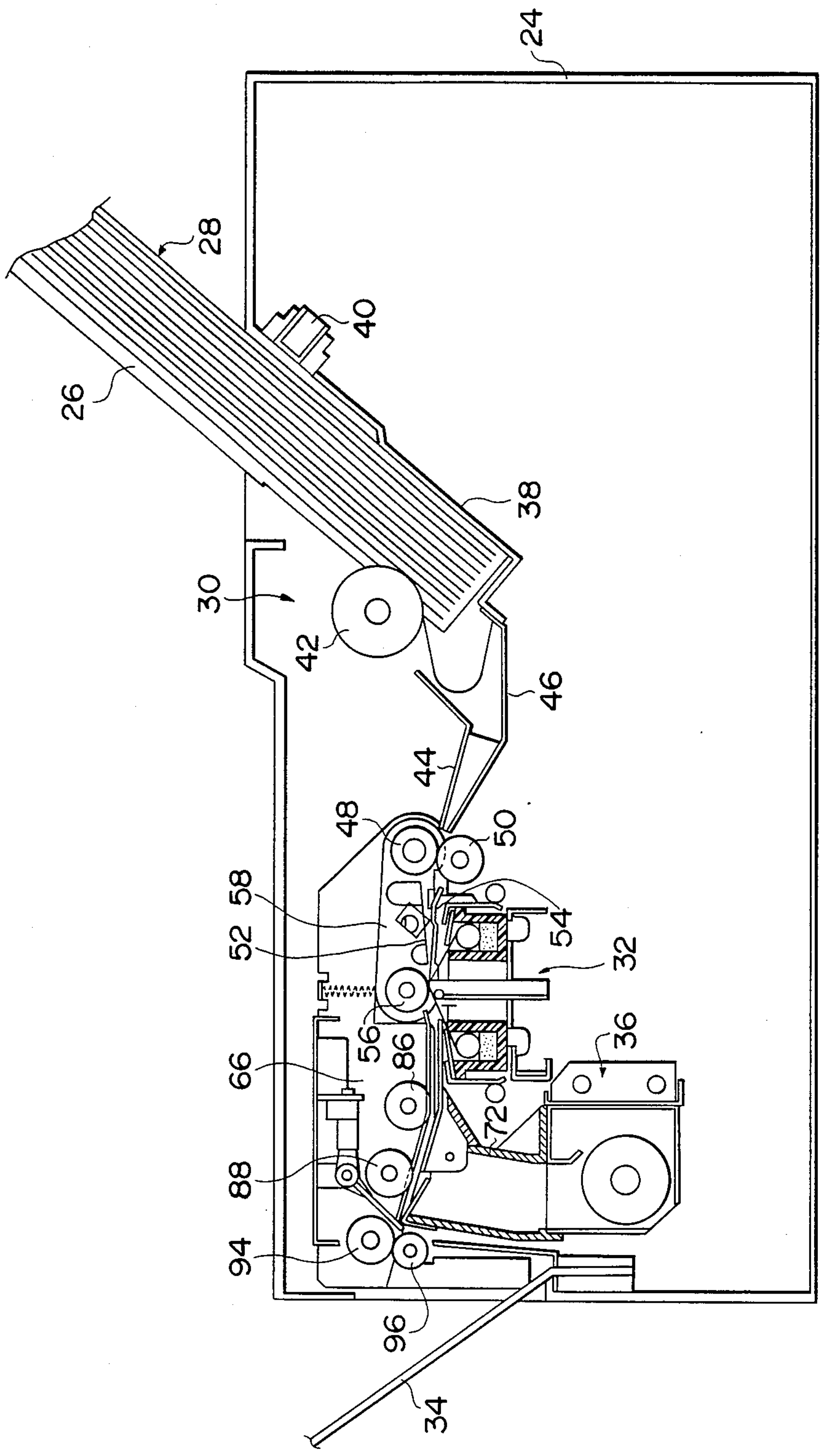
FIG. 1 is a longitudinal sectional view schematically showing an entire arrangement of an ink-jet printing apparatus according to an embodiment of the present invention.

FIG. 1 is a longitudinal sectional view schematically showing the entire arrangement of an ink-jet printing apparatus according to an embodiment of the present invention.

Paper supply cassette 28 storing a stack of a plurality of recording paper sheets 26 is detachably mounted on the rear portion of the upper surface of housing 24 of the ink-jet printing apparatus. Housing 24 houses paper feed means 30 for picking up, one by one, recording sheets 26 in cassette 28, printing cartridge 32 for performing printing on recording sheet 26 fed by paper feed means 30, and recording paper discharge means 36 for discharging recording sheet 26, printed by cartridge 32, to tray 34 provided in the front surface of housing 24.

Paper supply cassette 28 is inserted along cassette guide 38 in housing 24 from an upper right portion in FIG. 1 and mounted at a predetermined position on guide 38. The presence or absence of cassette 28 in guide 38 is detected by cassette sensor 40 attached to guide 38, and the presence or absence of recording sheet 26 in cassette 28 mounted at the predetermined position on guide 38 is detected by a paper sensor (not shown).

When paper feed roller 42 is rotated by a paper feed motor (not shown) in housing 24 in response to a printing instruction from a controller (not shown) connected to the ink-jet printing apparatus of this embodiment, recording sheets 26 having a number which corresponds to the printing instruction are sequentially picked up one by one from paper supply cassette 28. After recording sheet 26 is picked up, it is then guided by a pair of upper and lower paper guides 44 and 46 toward a rolling contact portion consisting of a pair of upper and lower aligning rollers 48 and 50 arranged at the inlet of printing cartridge 32. When the leading end of recording sheet 26 is abutted against the rolling contact portion, it is aligned in the position.

After a predetermined period of time has elapsed since a first single recording sheet 26 was feed, the pair of upper and lower aligning rollers 48 and 50 begin to rotate. As a result, the leading end of recording sheet 26, which is abutted against the rolling contact portion, is clamped by the pair of aligning rollers 48 and 50, and recording sheet 26 is supplied through a passage between a pair of upper and lower printing guides 52 and 54 of printing cartridge 32.

Figure 2:
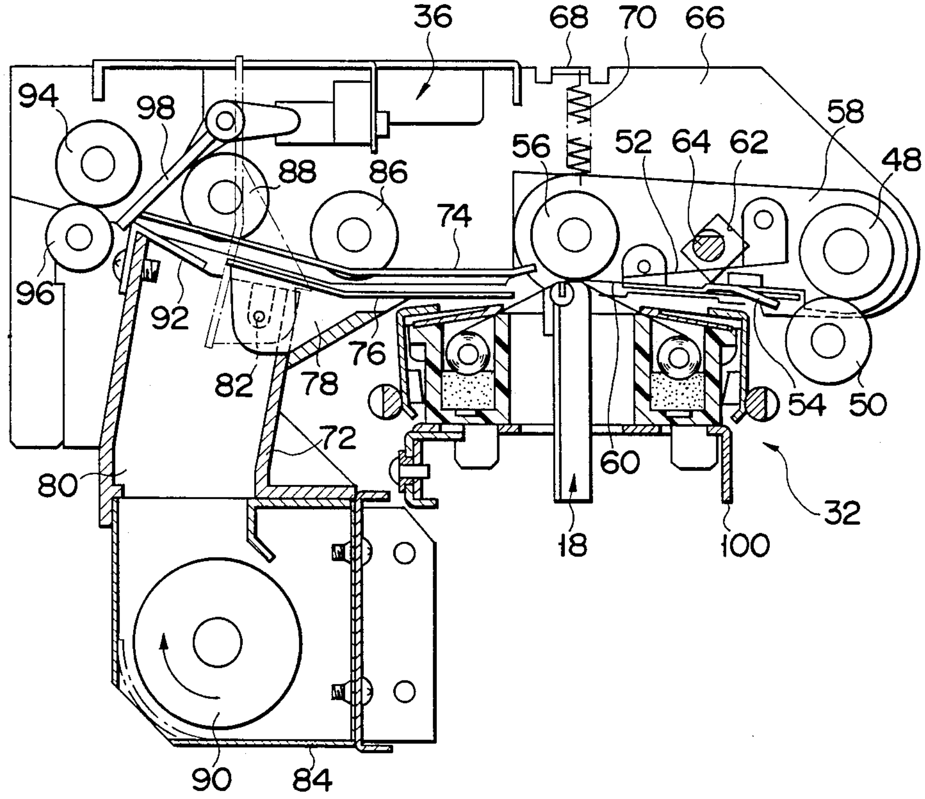
FIG. 2 is a longitudinal sectional enlarged view schematically showing upper and lower frames supporting a printing cartridge and a recording paper discharge means of the printing apparatus shown in FIG. 1.

FIG. 2 is a longitudinal sectional view schematically showing printing cartridge 32 and recording paper discharge means 36. A pair of printing guides 52 and 54 and head roller 56 arranged at a downstream of the pair of printing guides 52 and 54 are mounted on arm 58 which is pivotally attached on upper aligning roller 48. Guide plate 60 made of a thin stainless steel plate having a thickness of about 0.2 mm is mounted on the upper surface of lower printing guide 54. The leading end of guide plate 60 remains abutted against head roller 56 until recording sheet 26 is supplied to it. Guide hole 62 is formed in the side wall of arm 58, and cam shaft 64 extends through guide hole 62. Cam shaft 64 is coupled by means of a link (not shown) to a plunger-solenoid drive means (not shown) mounted on upper support frame 66 which rotatably supports the pair of upper and lower aligning rollers 48 and 50, so that cam shaft 64 is driven by the plunger-solenoid drive means.

The free end of arm 58 is suspended by tension spring 70 fixed to projection 68 of upper support frame 66, and is located above printing cartridge 32.

Printing cartridge 32 is detachably supported on lower stationary support frame 72, and upper support frame 66 is also rotatably mounted on upper aligning roller 48 and latched by a latching means (not shown) to lower stationary support frame 72.

Recording paper discharge means 36 has a pair of upper and lowr paper discharge guide plates 74 and 76 at the downstream of head roller 56. Upper paper discharge guide plate 74 is fixed on upper support frame 66.

A plurality of holes (not shown) are formed in lower paper discharge guide plate 76, and guide plate 76 is fixed on the upper surface of pivotal support member 78. Support member 78 is supported by pivot 82 to be pivotal within the upper end opening of duct 80 vertically extending in lower stationary support frame 72. In FIG. 2, the upper pivot position of support member 78 is indicated by an one-dot chain line, and its lower stationary position is indicated by a solid line. The outlet of blower 84 is coupled to the lower end opening of duct 80.

As shown in FIG. 2, a pair of upper and lower first pinch rollers 86 (lower first pinch roller 86 is omitted in the drawing for the sake of clarity) and a pair of upper and lower second pinch rollers 88 (lower second pinch roller 88 is omitted in the drawing for the sake of clarity) are provided on both sides of the pair of paper discharge guide plates 74 and 76. Two pairs of first and second pinch rollers 86 and 88 clamp several-mm wide non-printing regions on both sides of printed recording sheet 26 which project from both sides of the pair of paper discharge guide plates 74 and 76, and convey sheet 26 located between guide plates 74 and 76 toward paper discharge tray 34.

Fan 90 of blower 84 is driven during printing, and air is supplied toward the upper end opening of duct 80. The air supplied by blower 84 flows from the upper end opening of duct 80 toward upper paper discharge guide plate 74 through a plurality of holes (not shown) formed in lower paper discharge guide plate 76. A portion of the upper end opening of duct 80 which is not covered by guide plate 76 is covered by another lower guide plate 92 fixed on the upper portion of the side wall of duct 80. Lower guide plate 92 also has a plurality of holes. Therefore, the air at the upper end opening of duct 80 flows also through the holes (not shown) in lower guide plate 92 toward upper paper discharge guide plate 74.

Recording sheet 26 printed in printing cartridge 32 and introduced to a space between the pair of paper discharge guide plates 74 and 76 is pressed against upper paper discharge guide plate 74 by the air pressure flowing from the holes in lower paper discharge guide plates 76 and 92 while it is being conveyed between the pair of guide plates 74 and 76 by first and second pinch rollers 86 and 88.

Recording sheet 26 is conveyed between the pair of upper and lower paper discharge guide plates 74 and 76 without bringing its printed surface (the lower surface in FIG. 2) into contact with lower discharge guide plates 76 and 92. Therefore, the undried ink remaining on recording sheet 26 immediately after printing will not be smudged. Then air is blown onto the printed surface of sheet 26 to quickly dry the wet ink on sheet 26 immediately after printing.

Recording sheet 26 is then clamped at the outlets of the pair of upper and lower paper discharge guide plates 74 and 76 and another lower paper discharge guide plate 92 by upper and lower paper discharge rollers 94 and 96 rotatably supported by upper and lower support frames 66 and 72, respectively, and is discharged onto paper discharge tray 34 shown in FIG. 1 by rollers 94 and 96.

Lower paper discharge roller 96 consists of a pair of clamp roller members, located at both ends in the axial direction, for clamping the non-printing regions on both sides of recording sheet 26, a plurality of spur gear shaped plates arranged between the pair of clamp roller members to be separated from each other in the axial direction, and a plurality of collars having a diameter smaller than that of the clamp roller members and arranged among the plurality of spur gear shaped plates. The pair of clamp roller members, the plurality of spur gear shaped plates, and the plurality of collars are coaxial each other.

The outer diameter of each spur gear shaped plate is substantially the same as that of each clamp roller member, and the printing regions on the lower surface of recording sheet 26 are spotedly-supported by the plurality of tooth tops on the plurality of spur gear shaped plates.

Since the plurality of spur gear shaped plates do not apply much pressure to the printing regions on the lower surface of recording sheet 26, the ink is not smeared in the printing regions of the lower surface of recording sheet 26 which is clamped and conveyed by the pair of upper and lower paper discharge rollers 94 and 96.

As shown in FIG. 2, paper discharge check switch 98 is arranged immediately in front of the pair of upper and lower paper discharge rollers 94 and 96, and is mounted on upper support frame 66. Switch 98 detects the leading and trailing ends of recording sheet 26, discharged from a passage defined by the pair of upper and lower paper discharge guide plates 74 and 76 and another lower paper discharge guide plate 92, and detects whether sheet 26 is discharged onto paper discharge tray 34 shown in FIG. 1.

Figure 3:
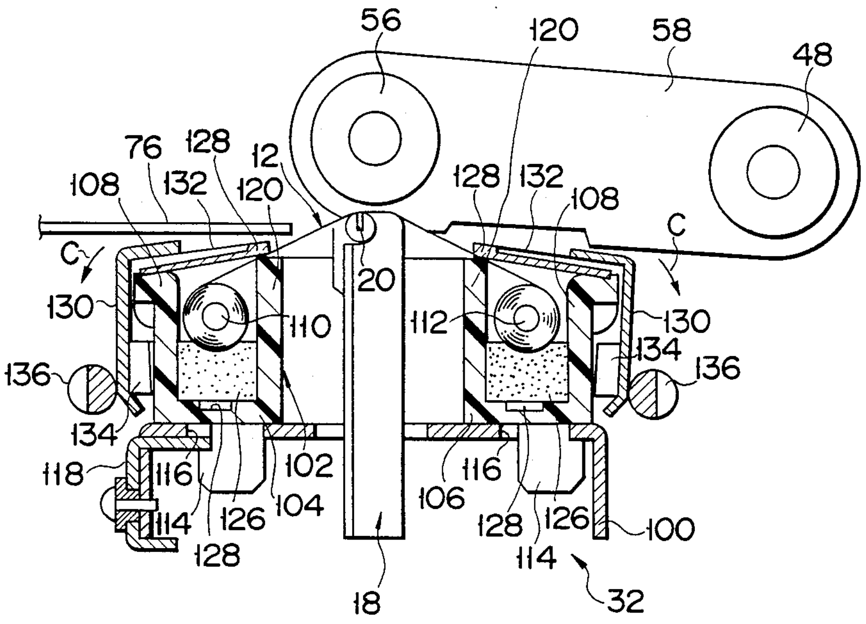
FIG. 3 is a longitudinal sectional enlarged view schematically showing an arm supporting aligning roller and head roller of the printing apparatus shown in FIG. 1, and the printing cartridge located below the arm.

FIG. 3 is an enlarged view schematically showing printing cartridge 32.

In printing cartridge 32, plate-like thermal printing head 18 is detachably mounted on cartridge support frame 100 so as to extend below head roller 56 along its axis. The upper end face of printing head 18 is rounded and a plurality of heating elements 20 are embedded therein along the longitudinal direction thereof.

Printing cartridge 32 also has nozzle member holder 102 detachably mounted on cartridge support frame 100 and storing film nozzle member 12. Film nozzle member 12 extends along and contacts the upper end face of thermal printing head 18. Holder 102 has a pair of holder main bodies 104 and 106 extending in the longitudinal direction of head roller 56 along the two side surfaces of thermal printing head 18. Nozzle member storing recess 108 extending in the longitudinal direction of head roller 56 and having an upper open end is formed in each of the pair of holder main bodies 104 and 106. A pair of nozzle member storing recesses 108 of the pair of holder main bodies 104 and 106 store a pair of film shafts 110 and 112, respectively. The two ends of film nozzle member 12 are fixed and wound on shafts 110 and 112. Both ends of each of shafts 110 and 112 are rotatably supported on both end walls of corresponding holder main body 104 or 106 and coupled to a rotational drive means (not shown).

The pair of holder main bodies 104 and 106 are integrally formed. When engaging pawls 114 formed on the bottom walls of main bodies 104 and 106 are inserted in positioning holes 116 formed in the upper wall of cartridge support frame 100 and engaged by engaging lever 18 which is slidably mounted on frame 100, holder main bodies 104 and 106 are fixed at predetermined positions on frame 100.

When the pair of holder main bodies 104 and 106 are fixed at predetermined positions on cartridge support frame 100, film nozzle member 12 extends along and contacts the upper end face of thermal printing head 18 between holder main bodies 104 and 106, as shown in FIG. 3. In this case, upper end faces 120 of opposing side walls of holder main bodies 104 and 106 are rounded in order to reduce friction with respect to the lower surface (surface friction to thermal head 18) of film nozzle member 12.

Figure 4:
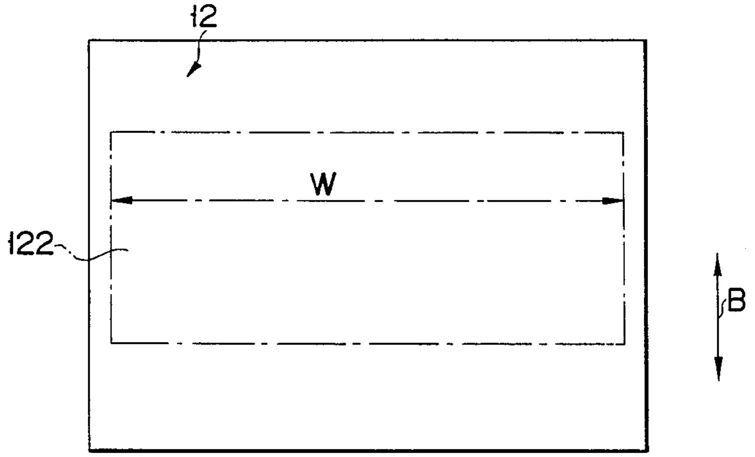
FIG. 4 is an exploded view schematicall8y showing a film nozzle member in the printing cartridge shown in FIG. 3.

Film nozzle member 12 is made of a metal (e.g., nickel or copper), a heat-resistant synthetic resin (e.g., a polyimide resin), or a film member obtained by stacking these elements in a multilayer manner, and has a thickness of about 10 to 30 μm. As shown in FIG. 4, a plurality of holes 10 having a diameter of about 20 to 30 μm are formed in hole formation region 122 of nozzle member 12. Hole formation region 122 has width W which is slightly larger than the length of the region of the upper end face of thermal printing head 18 on which a plurality of heating elements are arranged in the longitudinal direction. The plurality of holes 10 in region 122 form a row arranged in the widthwise direction W of region 122 at a pitch of about 40 to 50 μm, and a plurality of such rows are arranged in feed direction B of nozzle member 12 (reciprocated in this embodiment between the pair of film shaft members 110 and 112 as will be described later) at predetermined intervals, as shown in FIG. 4. In this case, holes 10 of each row are staggered from holes 10 of any of the adjacent rows by half the pitch, and the pitch between a plurality of holes 10 of each row and a plurality of holes 10 of any of the adjacent rows is substantially the same as the pitch of a plurality of holes 10 in the same row.

Figure 5:
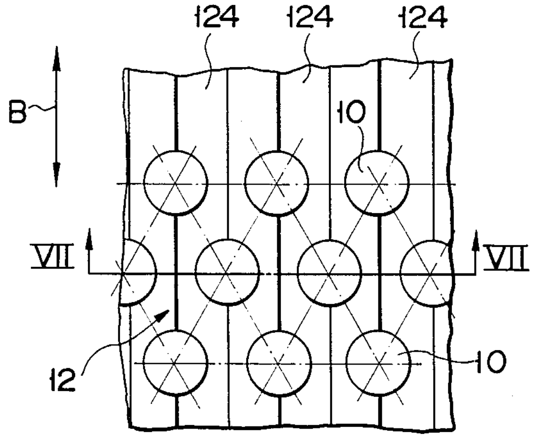
FIG. 5 is an enlarged plan view schematically showing some of a plurality of holes and some of a plurality of ink supply grooves formed in the hole formation region of the film nozzle member shown in FIG. 4.

A plurality of ink supply grooves 124 are formed in hole formation region 122 of the lower surface (i.e., the slidable contact surface with respect to thermal printing head 18) of film nozzle member 12. Ink supply grooves 124 are arranged to be spaced a predetermined gap apart from each other in the widthwise direction W of nozzle mbmer 12 and extending in feed direction B of nozzle member 12, as shown in FIGS. 4 and 5. Each ink supply groove 124 has a depth (substantially 5 to 10 μm) substantially ½ to ⅓ that of the thickness (substantially 10 to 30 μm) of nozzle member 12 and a width (substantially 20 to 25 μm) substantially half that of the hole pitch. Each ink supply groove 124 overlaps a plurality of holes 10 staggered with respect to feed direction B of nozzle member 12 by an area substantially half that of each hole 10. Ink supply grooves 124 can be formed by etching or electro-forming nozzle member 12 simultaneous to the formation of holes 10.

Ink coating member 126 is made of a material having a good water absorption and coating character, such as a Teflon felt, a foamed nitrile rubber, a foamed polyvinyl resin or the like, arranged in the bottom of each of the pair of nozzle member storing recesses 108. Ink coating member 126 is abutted against film nozzle member 12 which is wound on film shaft 110 or 112 in each recess 108. Ink is supplied to the pair of ink coating members 126 from an ink supply source (not shown) detachably mounted on the outer walls of the pair of holder members 104 and 106 through ink supply grooves 128 formed in the bottom of respective nozzle member storing recesses 108.

The upper end opening of each nozzle member storing recess 108 is covered with seal member 128 made of a synthetic rubber (e.g., a styrene-butadiene rubber and a nitrile rubber) having a water resistance. One end of each seal member 128 is mounted on the upper end face of the outer wall of holder member 104 or 106, and its other end is in contact with the edge of the upper surface (the surface facing the head roller 56) of film nozzle member 12.

The pair of seal members 128 are selectively applied with a load from a prssure applying mechanism in order to selectively seal the upper end openings of the pair of nozzle member storing recesses 108. The pressure applying mechanism has a pair of pivotal plates 130 extending along the outer side surface (side surfaces not opposing each other) of the pair of holder members 104 and 106, and pivotal plates 130 are rotatably mounted on the upper portions of both of the end faces (end walls supporting the two ends of film shafts 110 and 120) of the pair of holder members 104 and 106. Elastic plates 132 are mounted on the upper ends of pivotal plates 130 and extend above seal members 128. The distal ends of elastic plates 132 contact the abutting end portions of seal members 128 for film nozzle member 12. Each elastic plate 132 is made of an elastic thin plate, such as stainless steel, having a thickness of about 0.1 to 0.4 mm. The lower ends of the pair of pivotal plates 130 contact the outer surfaces of the pair of holder members 104 and 106 through leaf springs 134 provided thereto. Each leaf spring 134 is also made of an elastic thin plate, such as stainless steel, having a thickness of about 0.1 to 0.4 mm.

The outer surfaces of the pair of pivotal plates 130 of nozzle member holder 102 that are arranged at the predetermined positions on cartridge support frame 100, as shown in FIG. 3, oppose a pair of pressure control cam shafts 136 pivotally supported by lower support frame 72 shown in FIG. 2.

The pair of pressure control shafts 136 are rotated such that their outer circular surface portions abut against the outer surfaces of the pair of pivotal plates 130, as shown in FIG. 3, as far as a printing signal is input to the ink-jet printing apparatus of this embodiment from a controller (not shown) connected to it. When the outer circular surface portions of the pair of cam shafts 136 abut against the pair of pivotal plates 130, pivotal plates 130 are rotated in the directions of arrows C in FIG. 3 against the biasing force of leaf springs 134 and relieve the urging force applied on seal members 128 by leaf springs 134 through elastic plates 132. As a result, the edges of seal members 128 are brought to lightly contact the upper surface of film nozzle member 12.

When the edges of seal members 128 lightly contact the upper surface of film nozzle member 12, they scrape the excessive ink attached on the upper surface of nozzle member 12 while they do not require a great increase in drive force of nozzle member 12.

When the printing signal is not input to the ink-jet printing apparatus of this embodiment from the controller (not shown) connected to it or when nozzle member holder 102 is loaded on or unloaded from a predetermined position of cartridge support frame 100, pressure control cam shafts 136 are rotated such that their outer circular surface portions do not abut against the outer surfaces of the pair of pivotal plates 130. Pivotal plates 130 are thus rotated in directions opposite to those indicated by arrows C in FIG. 3 by the biasing force of the pair of leaf springs 134 and apply a load on the pair of seal members 128 through the pair of elastic plates 132. Upon reception of the load from leaf springs 134, seal members 128 strongly press film nozzle member 12 against the upper end faces of the inner walls of the pair of holder main bodies 104 and 106, and the upper end openings of the pair of nozzle member storing recesses 108 are completely closed. Therefore, even when the printing apparatus is not used for a long period of time or when nozzle member holder 102 is loaded on or unloaded from the predetermined position of cartridge support frame 100, ink is not undesirably split or evaporated from the pair of nozzle member storing recesses 108.

In order to load or unload nozzle member holder 102 on or from cartridge support frame 100 of the ink-jet printing apparatus, upper support frame 66 is released from a latched state on lower support frame 72 shown in FIGS. 1 and 2 by the latching means, and upper support frame 66, together with part of housing 24 covering frame 66, is rotated clockwise about upper aligning roller 48 as a fulcrum. As a result, the upper end face of holder 102 and/or frame 100 is exposed to the outside.

Finally, pivotal support member 78 of lower guide plate 76 is rotated counterclockwise about pivot 82 as a fulcrum, thereby enabling loading/unloading of nozzle member holder 102 on/from cartridge support frame 100.

Figure 7:
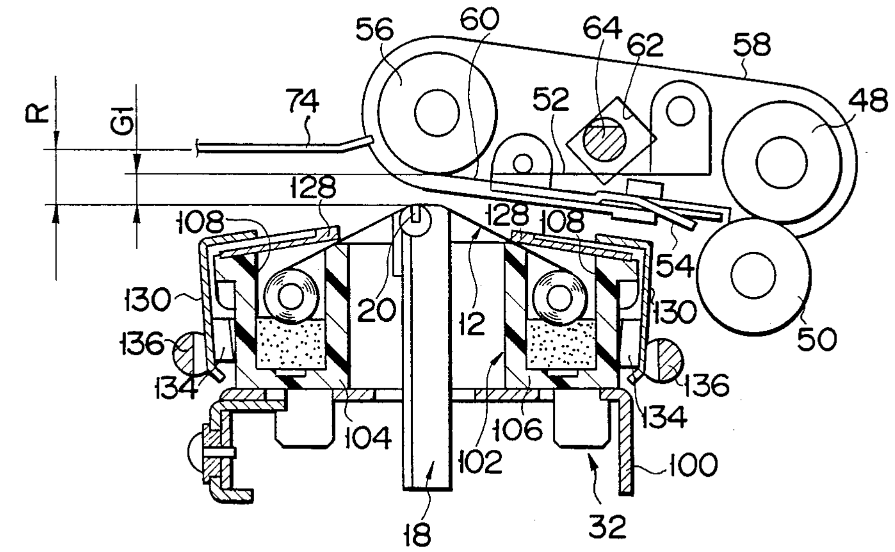
FIG. 7 is a longitudinal sectional view similar to FIG. 4 and schematically showing the states of the arm and the printing cartridge immediately before printing start for a single recording sheet and after printing stop for the same.

In the ink-jet printing apparatus having the above-described arrangement, when a printing instruction is supplied to it from the controller (not shown) connected to it, recording sheets 26 of a number in accordance with the printing instruction are sequentially picked up from paper supply cassette 28. The gap defined by film nozzle member 12 and guide plate 60 at the top portion of thermal head 18 is maintained at G1 by cam shaft 64 inserted in guide hole 62 of arm 58, as shown in FIG. 7, until recording sheet 26 from cassette 28 is introduced between the pair of printing guides 52 and 54 and its distal end is clamped between head roller 56 and guide plate 60 of lower guide plate 54. G1 is about 0.75 mm in this embodiment.

Gap R between upper paper discharge guide plate 74 and film nozzle member 12 at the top portion of thermal head 18 is set to be larger than gap G1.

In this case, since the outer circular surface portions of the pair of pressure control cam shafts 136 do not abut against the pair of pivotal plates 130, the pair of nozzle member storing recesses 108 of the pair of holder main bodies 104 and 106 are sealed by the pair of seal members 128 biased by the biasing force of leaf springs 134.

Figure 8:
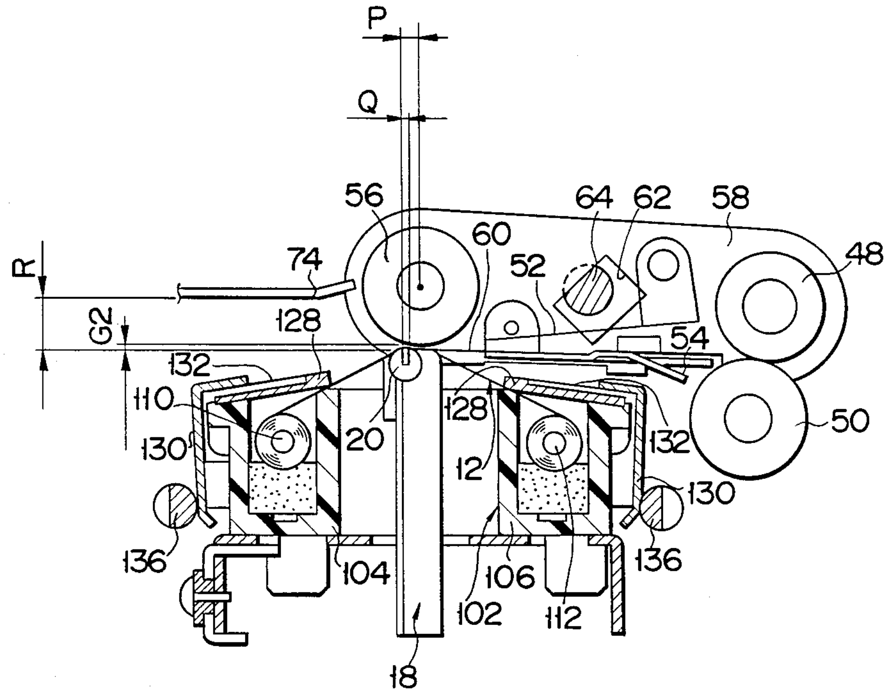
FIG. 8 is a longitudinal sectional view similar to FIG. 7 and schematically showing the states of the arm and the printing cartridge during printing on a single recording paper.

When a predetermined period of time elapses after the leading end of recording sheet 26 passes the distal end of guide plate 60, cam shaft 64 is rotated counterclockwise from the position shown in FIG. 7 until its notched surface portion abuts against the periphery of guide hole 62 in arm 58. As a result, arm 58 is pivoted counterclockwise about upper aligning roller 14 as a fulcrum, as shown in FIG. 8, until the distal end of guide plate 60 is brought into light contact with film nozzle member 12 at the top portion of thermal head 18. In this case, the gap between the upper surface of nozzle member 12 and the lower surface of recording sheet 26 is maintained at G2 which corresponds to the thickness of guide plate 60. G2 is about 0.2 mm in this embodiment.

In this case, difference P of positions between the center of head roller 56 and that of heating elements 20, and difference G of positions between the distal end of guide plate 60 and the center of heating elements 20 are produced. P and G are about 0.7 mm and about 0.3 mm, respectively, in this embodiment.

In response to the printing instruction described above, the pair of pressure control can shafts 136 are also rotated such that their outer circular surface portions abut against the pair of guide plates 130. Since the pair of leaf springs 134 are released from being biased by the pair of seal members 128 through the pair of pivotal plates 130 and the pair of elastic plates 132, the edges of the free ends of seal members 128 are brought into light contact with film nozzle member 12.

Simultaneously, left and right film shafts 110 and 112 are rotated counterclockwise and film nozzle member 12 fed from right film shaft 112 is taken up by left film shaft 110.

When hole formation region 122 of film nozzle member 12 shown in FIG. 4 is moved to the vicinity of heating elements 20 of thermal printing head 18, rotation of the pair of film shafts 110 and 112 is temporarily stopped. When the pair of aligning rollers 48 and 50 are started to rotate in order to feed recording sheet 26 supplied from paper supply cassette 28, the above-mentioned rotation of shafts 110 and 112 is restarted.

When a predetermined period of time elapses after the leading end of recording sheet 26 passes the distal end of guide plate 60, and arm 58 is moved to a lower position as shown in FIG. 8, the plurality of heating elements 20 are selectively heated in accordance with the printing instruction described above.

Bubbles are formed adjacently to heating elements 20 in ink 16 in the plurality of holes 10 of film nozzle member 12, that correspond to selectively heated heating elements 20. By the pressure of the bubbles, ink 16 is injected from holes 10 and attaches to and forms ink dots on recording sheet 26 opposing film nozzle member 12 through gap G2. A character, figure, and other symbols is printed by the group of ink dots.

In this manner, in printing cartridge 32 of the printing apparatus of the present invention as a combination of flim nozzle member 12 having a plurality of holes 10 and thermal head 18 having a plurality of heat-generating elements 20, nozzle hole clogging or bubble retention in nozzle holes does not occur in principle compared to a conventional printing cartridge as a combination of tubular nozzle members and piezoelectric resonators or heating elements corresponding to them in 1:1 correspondence. The respective distance between the plurality of holes 10 in nozzle member 12 can be greatly reduced than those between a plurality of tubular nozzle members in the conventional apparatus. Therefore, the resolution of a printed character, figure, or other symbols is increased, and a plurality of characters, figures, and other symbols can be printed at once.

Figure 6:
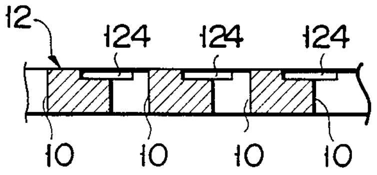
FIG. 6 is a schematic sectional view taken along the line VII—VII in FIG. 5.

In film nozzle member 12 used in the ink-jet printing apparatus of the present invention, a plurality of holes 10 are formed in its surface opposing thermal head 18 to be staggered in moving direction B of nozzle member 12 and to constitute a plurality of rows. Holes 10 in respective rows are coupled to each other by ink supply grooves 124, as shown in FIGS. 5 and 6. Therefore, even when nozzle member 12 is conveyed at a speed considerably lower than that of recording sheet 26, or even when the urging force of nozzle member 12 against the top portion of head 18 is excessively large due to some reason, once hole 10 is emptied by ink ejection, ejection, it is refilled immediately with ink 16 in other holes 10 through grooves 124. This ensures a constant sufficient printing density when the same hole 10 is consecutively used for printing, resulting in high-quality printing.

When the convey speed of film nozzle member 12 is decreased, the length of nozzle member 12 in its feed direction B can be reduced, resulting in the size reduction of nozzle member holder 102, printing cartridge 32, and thus the entire ink-jet printing apparatus. Furthermore, since the amount of wear between nozzle member 12 and the top portion of thermal printing head 18 is decreased, the service life of them can be prolonged.

When printing on single recording sheet 26 is to be ended, voltage supply to heating elements 20 for printing is stopped before the trailing end of the same recording sheet 26 passes the distal end of guide plate 60. Subsequently, film nozzle member 12 is taken up by left film shaft 110 until its entire hole formation region 122 reaches ink coating member 126 in left holder member 104.

When next recording sheet 26 is supplied to a portion between head roller 56 and thermal head 18, film nozzle member 12 is fed from left film shaft 110 to right film shaft 112 in the same manner as described above, thereby performing printing on next recording sheet 26. More specifically, in the ink-jet printing apparatus of this embodiment, film nozzle member 12 is reciprocated above thermal head 18 to continuously perform printing on a plurality of recording sheets 26 that are supplied consecutively.

When a predetermined period of time lapses after printing on single recording sheet 26 is ended, cam shaft 64 is rotated clockwise until its outer circular surface portion abuts against the periphery of guide hole 62 in arm 58, as shown in FIG. 7. As a result, arm 58 is rotated clockwise about upper aligning roller 48 as a fulcrum and is returned to the upper position shown in FIG. 7. In this case, the non-printing region on the trailing end portion of printed recording sheet 26 is clamped by guide plate 60 of lower printing guide 54 and head roller 56.

When single recording sheet 26 is supplied to thermal printing head 18 from paper supply cassette 28 to be printed, its leading and trailing end portions are clamped by guide plate 60 of arm 58 at its upper position and head roller 56 before and after printing, respectively, as described above. Therefore, the leading or trailing end portion of single recording sheet 26 supplied from cassette 28 to thermal printing head 18 to be printed is not bent or curled to contact the upper surface of film nozzle member 12. Even when a small amount of excessive ink is attached on the upper surface of nozzle member 12, it does not soil the leading or trailing end portion of recording sheet 26.

When recording sheet 26 is introduced from a space between the distal end of guide plate 60 of lower printing guide 54, supported by arm 58 at its upper position, as shown in FIG. 7, and head roller 56 to a space between the pair of paper discharge guide plates 74 and 76 shown in FIG. 2, it is supplied to paper discharge tray 34 shown in FIG. 1 by first and second pairs of pinch rollers 86 and 88, as described above.

When printing on recording sheets 26 of a number in accordance with the printing instruction supplied from the controller (not shown) connected to the ink-jet printing apparatus of this embodiment is completed, the pair of film shafts 110 and 112 are rotated clockwise until hole formation region 112 on film nozzle member 12 is taken up by right film shaft 112.

Thereafter, the pair of pressure control shafts 136 are rotated to release them from abutting against the pair of pivotal plates 130 at its outer circular surface portions. As a result, the biasing force of the pair of leaf springs 134 is transmitted to the pair of seal members 128 through the pair of pivotal plates 130 and the pair of elastic plates 132, and seal members 128 abut against the upper end faces of opposite inner walls of the pair of holder main bodies 104 and 106 to clamp film nozzle member 12. Then, the power source of the ink-jet printing apparatus is turned off, if necessary.

This embodiment is used only for describing the present invention and does not limit the present invention. Any modifications or changes within the spirit and scope of the invention are included in the present invention.

What is claimed is:

1. An ink-jet printing apparatus comprising:

a thermal printing head having heating elements; and a film nozzle member having a plurality of holes for holding an ink and a plurality of connecting grooves, formed in a surface thereof opposing said heating elements of said thermal head, for connecting some of said plurality of holes, the ink in said plurality of holes being selectively heated by said heating elements while said film nozzle members moves relative to said heating elements, so that bubbles are formed adjacently to said heating elements in the heated ink and the pressure of bubbles eject the heated ink from said plurality of holes to make the ejected ink attach on a printing member conveyed close to said film nozzle member in the vicinity of said thermal printing head, thereby performing printing.

2. An apparatus according to claim 1, wherein said plurality of connecting grooves of said film nozzle member extend parallel to the travelling direction of said film nozzle member.

3. An apparatus according to claim 1, wherein each of said plurality of connecting grooves of said film nozzle member overlap said plurality of holes by substantially half an area of each of said plurality of holes, said plurality of holes being connected to one another by corresponding connecting grooves.

4. An apparatus according to claim 1, wherein a width of said plurality of connecting grooves of said film nozzle member falls within a range between values slightly smaller and larger than a pitch of said plurality of holes, and a depth of said connecting grooves of said film nozzle member is substantially ⅓ the thickness of said film nozzle member.

5. An apparatus according to claim 4, wherein the width of said plurality of connecting grooves of said film nozzle member is substantially 10 to 50 μm, and the depth of said plurality of connecting grooves of said film nozzle member is substantially 5 to 10 μm.

6. A film nozzle member comprising:

a film base member;

a plurality of nozzle holes formed in said film base member for holding an ink; and a plurality of connecting grooves in one surface of said film base member, each of which connects some of said nozzle holes to allow a flow of ink between said some holes, and each of which has a depth of less than approximately ⅓ of the thickness of said film base member, so as to hold the ink by surface tension.

7. A film nozzle member according to claim 6, wherein said plurality of connecting grooves extend along a plurality of parallel straight lines.

8. A film nozzle member according to claim 6, wherein each of said plurality of connecting grooves overlaps said plurality of holes by substantially half an area of each hole, said plurality of holes being connected to each other through corresponding connecting grooves.

9. A film nozzle member according to claim 6, wherein said plurality of holes are arranged on said film base member at constant intervals, and the width of each connecting groove is approximately one half of a pitch of said nozzle holes.

10. A film nozzle member according to claim 9, wherein the width of said plurality of connecting grooves is substantially 10 to 50 μm, and the depth of said plurality of connecting grooves is substantially 5 to 10 μm.

11. An ink-jet printing apparatus comprising:

a thermal printing head having a plurality of heating elements; and a film ink holding means having a plurality of holes, for holding an ink, which has grooves at least in its one surface to connect some of said plurality of holes, and said heating elements of said thermal printing head oppose the surface of said film ink holding means having said grooves.

12. An apparatus according to claim 11, wherein said film ink holding means moves relative to said heating elements and said grooves of said film ink holding means extend parallel to the travelling direction of said film ink holding means.

13. An apparatus according to claim 11, wherein each of said grooves of said film ink holding means overlaps said plurality of holes by substantially half an area of each of said plurality of holes, said plurality of holes being connected to one another by a corresponding groove.

14. An apparatus according to claim 11, wherein a width of said grooves of said film ink holding means falls within a range between values slightly smaller and larger than a pitch of said plurality of holes, and a depth of said grooves of said film ink holding means is substantially ⅓ the thickness of said film ink holding means.

15. An apparatus according to claim 14, wherein the width of said grooves of said film ink holding means is substantially 10 to 50 μm, and the depth of said grooves of said film ink holding means is substantially 5 to 10 μm.

* * * * *